United States Patent [19]
Kelyman, Jr.

[11] Patent Number: 4,479,581
[45] Date of Patent: Oct. 30, 1984

[54] APPARATUS AND METHOD FOR PROCESSING BAGGED REFUSE

[75] Inventor: John Kelyman, Jr., Germantown, Tenn.

[73] Assignee: Beloit Corporation, Beloit, Wis.

[21] Appl. No.: 403,158

[22] Filed: Jul. 29, 1982

[51] Int. Cl.³ .................. B02C 7/04; B07B 13/05; B03B 1/00
[52] U.S. Cl. .................. 209/3; 209/233; 209/361; 209/672; 241/93; 241/236; 241/DIG. 38
[58] Field of Search .......... 209/3, 271, 361, 233, 209/671, 672; 241/93, 236, 231, DIG. 38

[56] References Cited

U.S. PATENT DOCUMENTS

| | | | |
|---|---|---|---|
| 2,527,779 | 9/1947 | Mclain et al. | 241/231 |
| 3,596,842 | 8/1971 | Barber | 209/3 |
| 3,596,914 | 3/1971 | Liebman | 241/236 |
| 3,870,627 | 3/1975 | Herkes | 209/233 |
| 3,876,157 | 4/1975 | McIntire et al. | 241/17 |
| 4,037,723 | 7/1977 | Wahl | 209/104 |
| 4,098,464 | 7/1978 | Niedner et al. | 241/DIG. 38 |
| 4,385,732 | 5/1983 | Williams | 241/236 |

Primary Examiner—Frank W. Lutter
Assistant Examiner—Wm. Bond
Attorney, Agent, or Firm—Hill, Van Santen, Steadman & Simpson

[57] ABSTRACT

A raw refuse processing apparatus disk screen separating bed has a series of interdigitated rotatable disk assemblies and is adapted to receive raw refuse at one end, including bagged refuse, and at an intermediate location along its length the separating bed is provided with a bag breaker arrangement comprising a floating carriage having bag delaying disk assemblies and overlying bag ripping disk assemblies of the separating bed.

17 Claims, 5 Drawing Figures

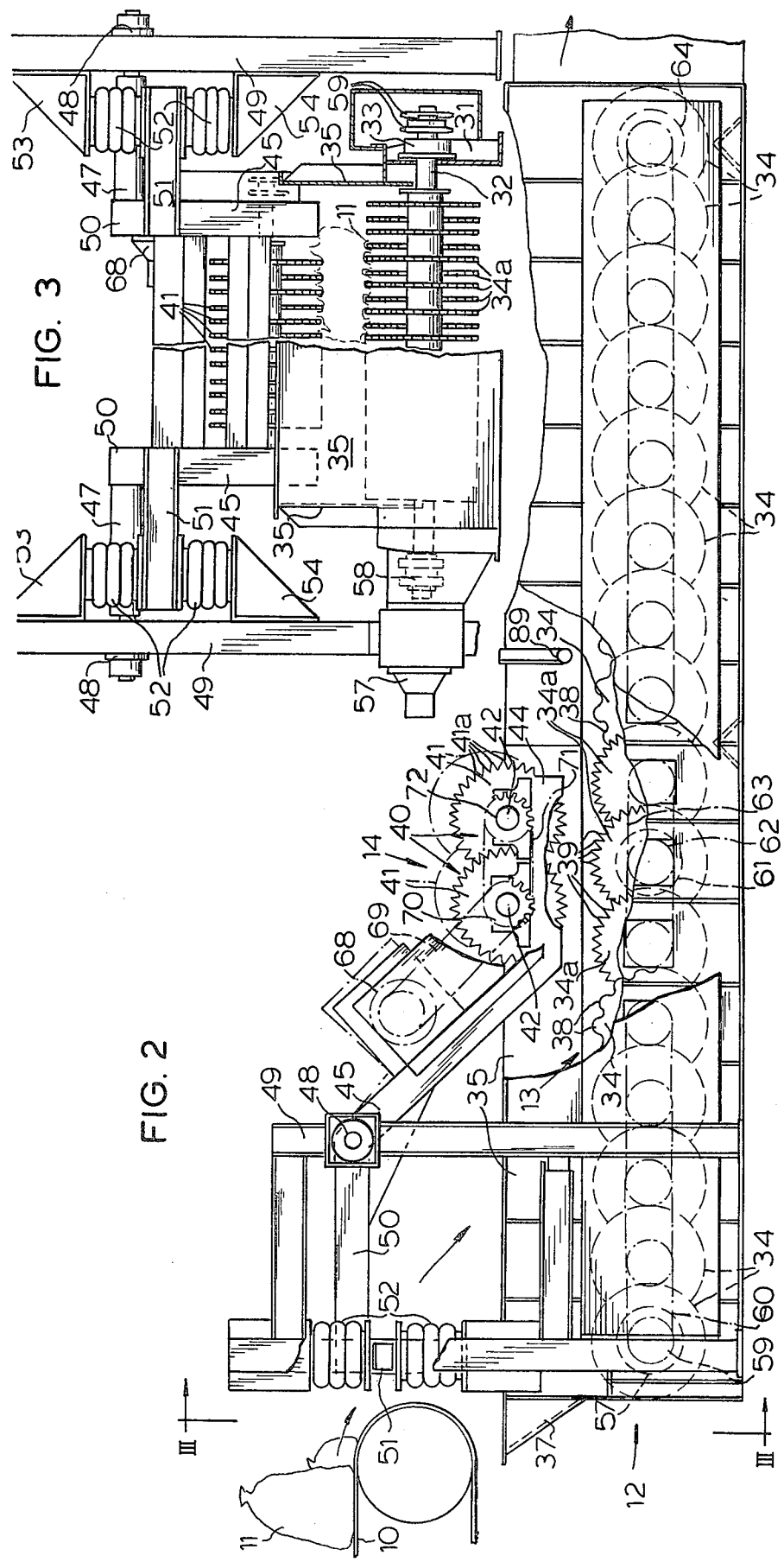

APPARATUS AND METHOD FOR PROCESSING BAGGED REFUSE

This invention relates to a new and improved apparatus and method for processing bagged refuse, and is more particularly concerned with classifying collected municipal refuse.

Much municipal refuse is commonly collected in plastic trash bags. Where it is desirable or necessary to classify the trash by separating recyclable fractions from land fill material, such as glass and ferrous materials for recycling and paper, to serve as shredded fuel, a persistent problem has existed in respect to liberating the bagged trash.

One way that the contents of trash bags has heretofore been liberated has been by means of what is known as a trommel screen drum, which is a large tilted cylindrical drum having openings in its cylindrical wall within which the trash bags are tumbled and broken with some success. However, due to the tumbling action, glass containers break, all of the trash bags may not break open in the drum, the rolling mass of material in the drum tends to impede the screening process, resulting in poor recyclable material recovery. Further, trommel drums are necessarily of large size. For example, to handle fifty tons per hour, a twelve foot diameter drum approximately 45 feet long is required. Such drums are liable to distortion under load, must be stopped periodically to unplug screen holes. Sometimes they derail from their rotary support and require a crane for lifting the drums back onto the support, often requiring removal of the load in the drum before the crane lifting operation. Abrasive trash material tends to damage the drive components of the drum. Capital costs for the trommel drum apparatus are very high. Much energy is required to drive trommel drums.

An important object of the present invention is to provide new and improved apparatus and method for processing bagged refuse material and which will not only effect substantial capital cost savings as compared with trommel screen drum apparatus, but also operate with much less energy expenditure to process equivalent tonnage of refuse in much smaller operating space, will greatly minimize down time for any reasons, and will be capable of much superior screening results and recovery of usable fractions of the refuse being processed.

To this end, the invention provides raw refuse processing apparatus, comprising a disk screen separating bed having a series of interdigitated rotatable disk assemblies and adapted to receive raw refuse including bagged refuse, and bag breaker means cooperating with bag breaker disk assemblies in said bed for breaking the bags and liberating the bag contents onto said separating bed.

The invention also provides a method of processing raw refuse, comprising receiving raw refuse including bagged refuse on a disk screen separating bed comprising a series of interdigitated rotatable disk assemblies including bag breaker disk assemblies, and in cooperation with the bag breaker disk assemblies breaking the bags and liberating the contents of the bags onto said separating bed.

Other objects, features and advantages of the invention will be readily apparent from the following description of a representative embodiment thereof, taken in conjunction with the accompanying drawings although variations and modifications may be effected without departing from the spirit and scope of the novel concepts embodied in the disclosure, and in which:

FIG. 2 is a side elevational view of a disk screen separating bed and bag breaker assembly embodying the invention;

FIG. 3 is a fragmental end elevational view of the apparatus taken along the line III—III of FIG. 2;

Figure 1:
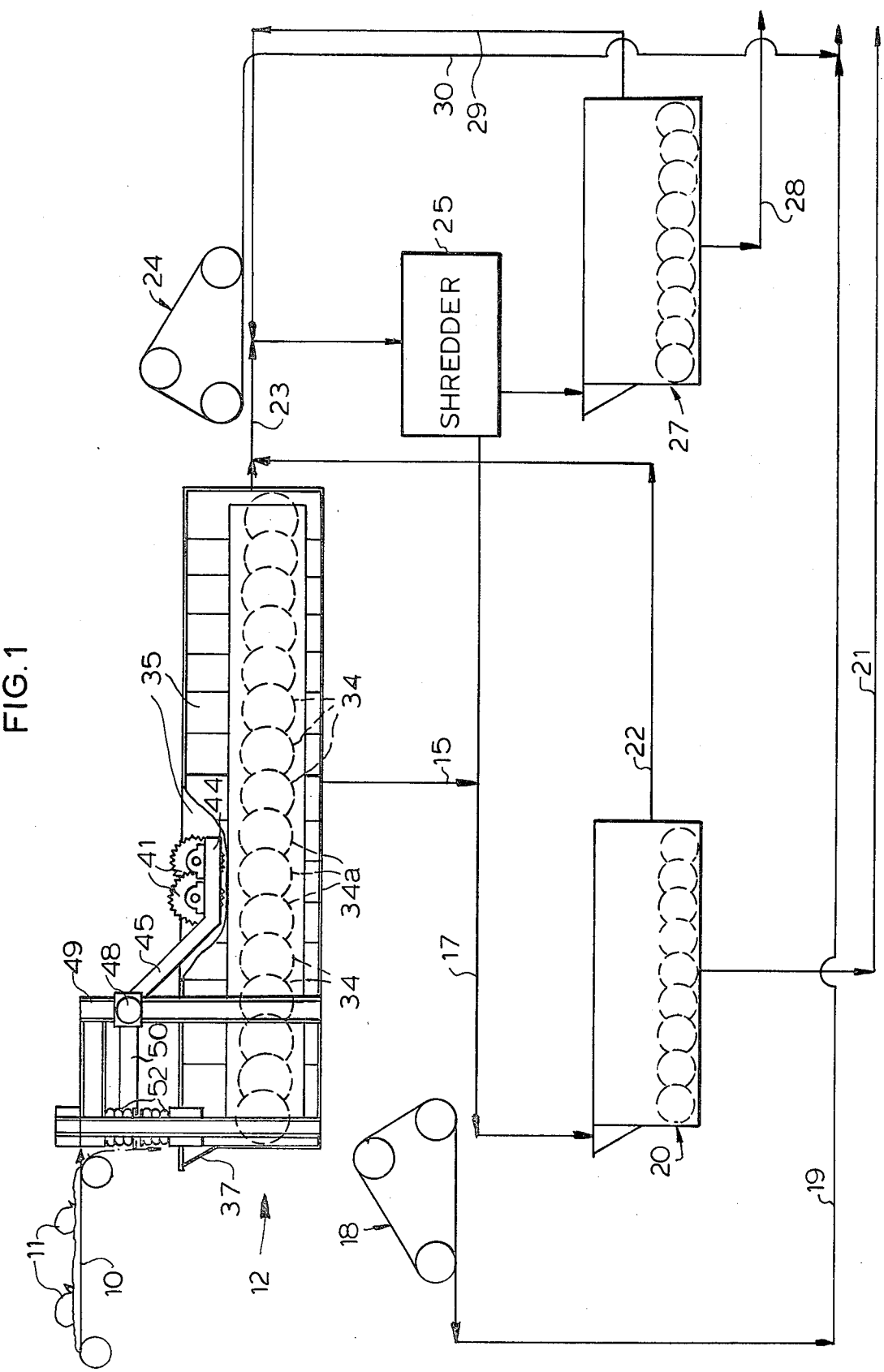
FIG. 1 is a schematic illustration of a refuse processing system employing the present invention.

By way of example, a refuse processing system as shown in FIG. 1 comprises conveyor means 10 for delivering raw refuse, including refuse enclosed in bags 11, to apparatus 12 having a disk screen separating bed 13 and bag breaker means 14 cooperating with the screen bed 13 for breaking the bags 11 and liberating the bag contents onto the separating bed. Material dropping through the separating bed 13, as indicated by the arrowheaded line 15 and including glass bottles, cans and the like, drops onto conveyor means 17 where glass articles may be picked off and a magnetic separator 18 removes ferrous material such as cans. The ferrous material is directed to a take-away conveyor path 19 for collection at a suitable point. Other material from the conveyor 17 goes to a disk screen 20 where small size land fill material is screened out and directed into a take-away conveyor path 21. Larger size material generally comprising mostly combustible particles, such as paper, is returned along a path 22 to a take-away conveyor path 23 leading from the separating bed 13 and after passing a magnetic ferrous material removal device 24, is directed to a shredder 25, where the combustible material is comminuted to a desirable fuel particle size and delivered to a sizing disk screen 27 which separates desired particle size of the refuse derived fuel for delivery to a conveyor path 28 for delivery to a point of boiler firing, or a storage or transportation area. Oversize combustible material from the disk screen 27 is recycled by way of a path 29 to the shredder 25. The ferrous materials separated by the magnetic separator 24 are delivered by way of a path 30 to the take-away conveyor means 19.

Figure 4:
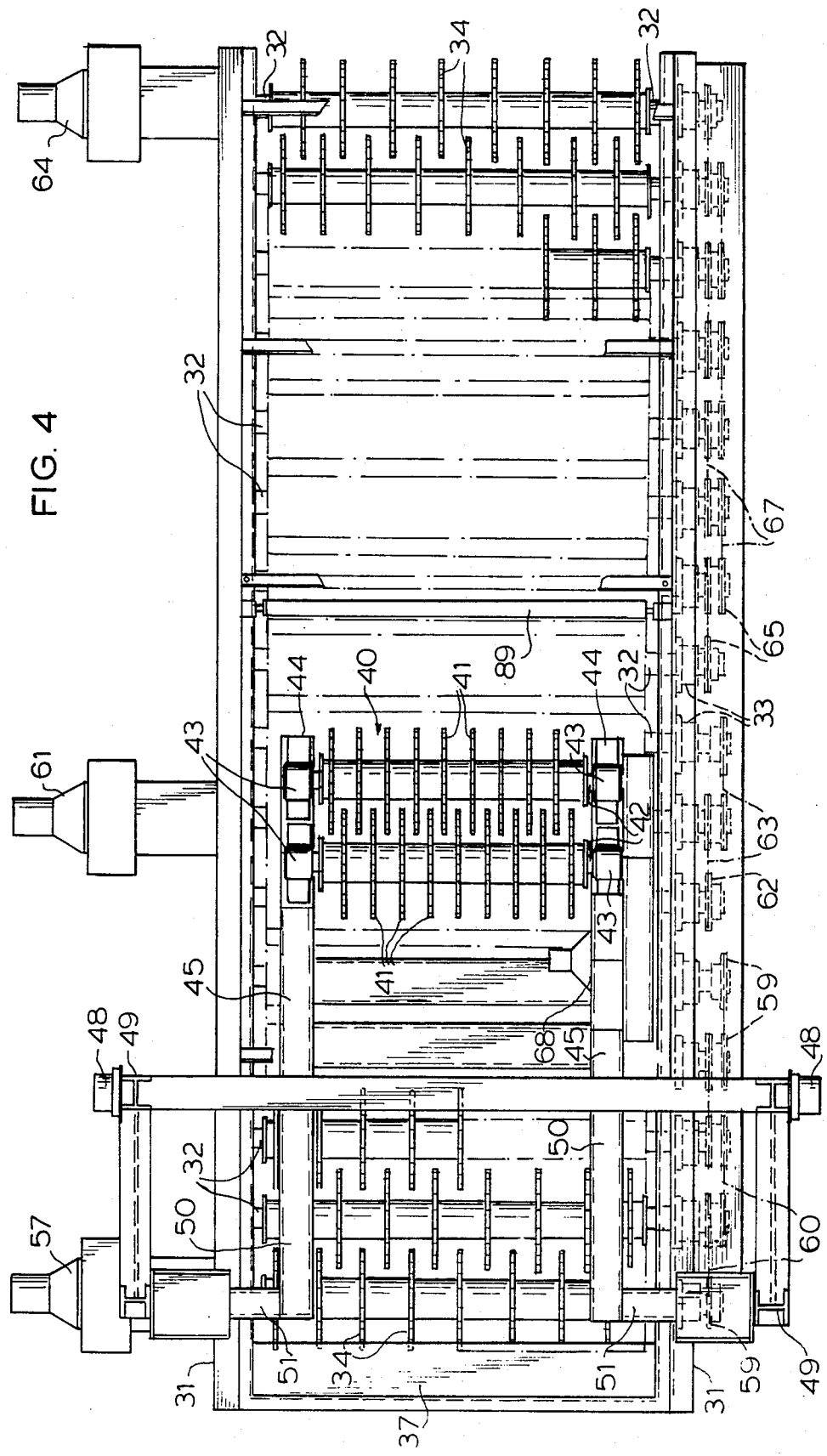
FIG. 4 is a top plan view of the apparatus.

Referring now to the apparatus 12, with which the present invention is particularly concerned, an elongate frame structure 31 (FIGS. 2-4), which supports the separating bed 13, comprises a series of interdigitated rotatable disk assemblies on the order of the disk separator disclosed in U.S. Pat. No. 4,037,723. Each of the disk assemblies comprises a shaft 32 journalled at its opposide ends in suitable bearings 33 carried by the frame 31. On each of the shafts 32 is mounted a set of screen disks 34 which are offset relative to and interdigitated with the disks of the companion disk assemblies. All of the disks are rotatably driven in the same advancing direction to carry trash, delivered by the conveyor 10 to the separating bed 13, from the delivery end of the bed toward the opposite end of the bed. Trash on the bed 13 is confined thereto by longitudinally extending spaced upstanding retainer walls 35 having between their ends at the delivery end of the bed 13 a lead-in chute wall 37 underlying the delivery end of the conveyor 10.

For screen separating on the order of 50 tons-per-hour flow rate of raw refuse, the disk screen may be about 6 feet wide by 18 feet long and by 6 feet high.

Each of the screen disks 34 may be about 20-¾" in diameter with a 6" slot radial distance between the surfaces of the adjacent shafts 32. As shown, there may be a series of sixteen of the interdigitated rotatable disk assemblies in the bed 13. Inter-face openings between the interdigitated disks may be about 3½", except for those disk assemblies which cooperate with the bag breaker means 14.

In a preferred arrangement, the first five disk assemblies in the series, starting at the chute 37, provide a first phase treating section which receives the refuse delivered to the apparatus for first step separation and sorting of liberated refuse. Here the material which will pass through the screen, drops out and other material continues to travel along the top of the disk screen bed. The next three rotatable disk assemblies comprise a bag breaker second phase treating section having disks 34a which cooperate with the bag breaker means 14. The remaining eight disk assemblies provide a third phase treating section of the separating bed 13 and continue the sorting process, including sorting the refuse liberated from the broken trash bags. The disks 34 upstream and downstream from the bag breaker section are preferably provided with rounded, sinuous, lobe-like peripheral projections 38, of which there may be twelve on each disk. On the other hand, the three bag breaker disk assemblies 34a are desirably provided with a large number of sharp pointed projections 39 which, in a typical example, may be 44 in number on each disk so as to facilitate ripping plastic trash bags efficiently for liberating the refuse contents. In addition, the disks 34a desirably have a closer inter-face opening spacing, such as about 1½ inch, to enhance bag breaking efficiency.

In a preferred arrangement, the bag breaker means 14 comprises a floating rocker carriage carrying a pair of interdigitated disk assemblies 40 similar to the three disk assemblies having the disks 34a in the bag breaker section of the disk screen bed 13. Each of the disk assemblies 40 has a set of rider disks 41 uniformly spaced similarly as the bed disks 34a, along a respective shaft 42 journalled at its opposite ends in bearings 43 mounted on spaced parallel supporting extensions 44 of carriage arms 45 extending obliquely upwardly to coaxial laterally outwardly projecting respective trunnions 47 which are journalled in respective bearings 48 mounted on a frame 49 straddling the refuse receiving end of the disk screen separating bed 13. Projecting from the upper ends of the arms 45 are respective generally horizontal, parallel extensions 50 which have at their distal ends laterally outwardly extending horizontal legs 51 which are engaged between respective upper and lower air springs 52 supported between upper and lower brackets 53 and 54 carried by the frame 49. Through this arrangement, the carriage of the breaker means 14 is adapted to yield rockably about the full line and dot-dash line positions in FIG. 2, the accommodate variable sized bagged loads of refuse. The air springs 52 normally maintain the carriage at an elevation above the disks 34a to provide a spacing between the overlying breaker disks to accommodate minimally loaded trash bags. As best observed in FIG. 2, the spaced parallel axes of the breaker disks desirably located above the spaces between the axes of the lower breaker disks 34a. Each of the disks 41 has pointed tooth projections 41a, preferrably similar to the projections 39 of the disks 34a, and of the same number.

For optimum results, the several sections of the screen disk assemblies in the separating bed 13 and the rider disk assemblies are caused to rotate at various desirable differential speeds. For example, the five disk assemblies at the refuse receiving end of the bed may be caused to rotate at about 40 to 60 rpm, the three second section bag breaker discs 34a may be caused to rotate at 80 to 100 rpm, the rider disks 41 may be caused to rotate from 0 to 40 rpm and the last eight disk assemblies in the separating bed may be caused to rotate at 60 to 100 rpm. Inasmuch as the loaded trash bags are in effect held by the sharp projections or teeth 41a of the rider breaker disks 41, the tooth projections of the substantially more rapidly rotating breaker disks 34a can effectively rip and shred the trash bags and thus efficiently liberate the refuse contents for separation on the downstream section of the separating bed 13.

Figure 5:
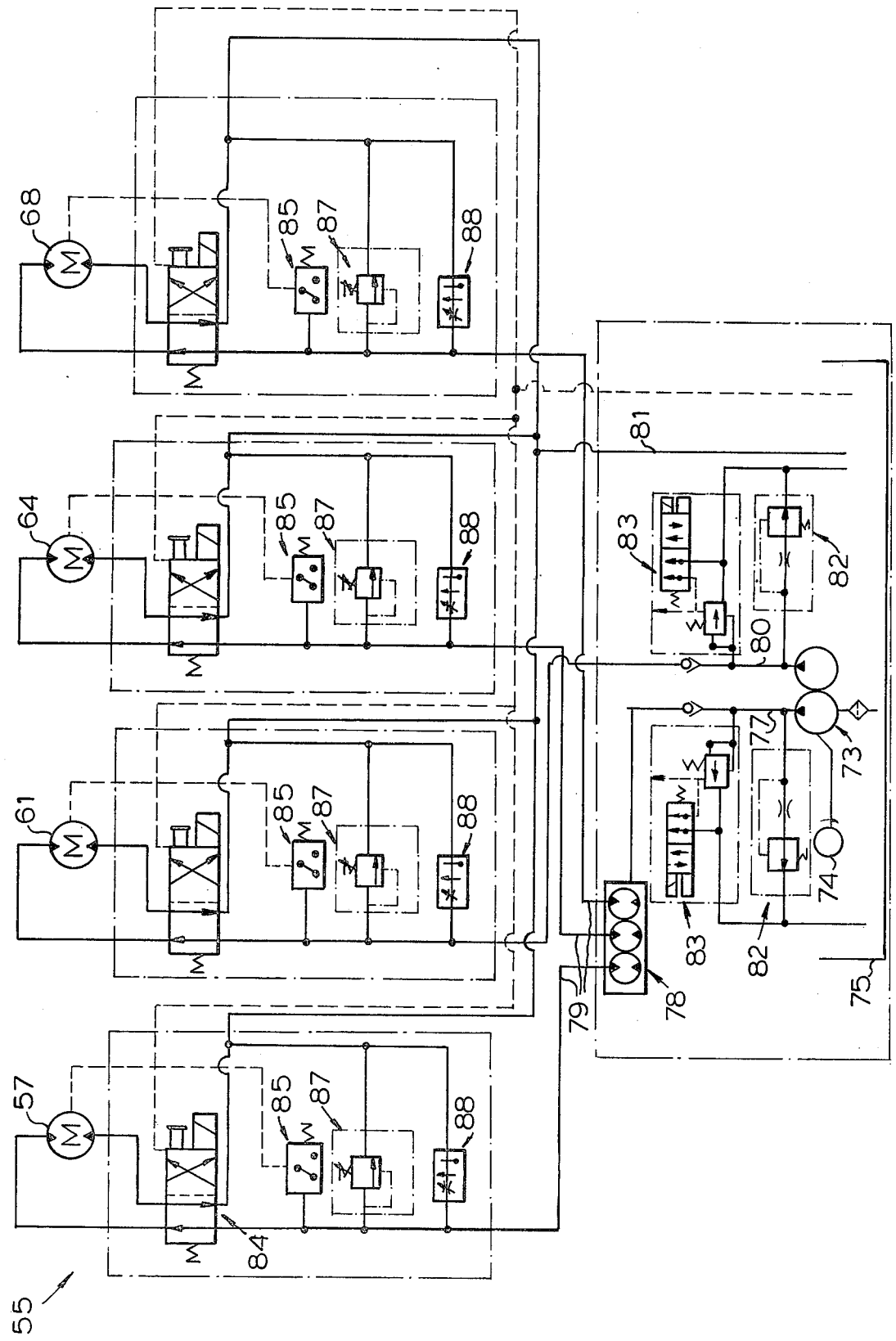
FIG. 5 is a schematic illustration of a hydraulic motor driving and control circuit.

Driving of the disk assemblies in each section of the apparatus 12 is desirably effected by hydraulic motor means in a hydraulic control system 55 exemplified in FIG. 5. For driving the first section of disk assemblies in the bed 13, a hydraulic motor 57 is drivingly connected to the shaft 32 of the first disk assembly in the first section series as by means of a coupling 58 (FIG. 3). At its opposite end, the motor driven shaft 32 is drivingly connected with the shafts 32 of the other four disk assemblies in the first section of the separating bed by means of sprockets 59 on the shaft ends and connecting drive transmission chains 60. Similarly, a hydaulic motor 61 is drivingly coupled to the shaft 32 of the center one of the three disk assemblies having the breaker disks 34a, and driving power is transmitted by means of respective sprockets 62 and transmission chains 63 to the other two disk assemblies in the this section. In similar fashion, a hydraulic motor 64 synchronously drives the disk assemblies in the third or downstream section of the separating bed 13, being desirably drivingly coupled to the shaft 32 of the last disk assembly in this section and power being transmitted through sprockets 65 on the several shafts in the third section and transmission chains 67. A hydraulic motor 68 mounted on one of the floating rider carriage arms 45 is drivingly connected as by means of a drive chain 69 with a sprocket 70 carried by the adjacent breaker disk assembly shaft 42 which, in turn, is coupled as by means of a transmission chain 71 to a sprocket 72 on the remaining breaker disk assembly shaft 42.

For actuating and controlling the several hydraulic driving motors, a double pump 73 (FIG. 5) driven by a motor 74 pumps hydraulic fluid from a reservoir 75 through a hydraulic line 77 and a flow divider 78 and respective branch lines 79 to the three drive motors 57, 64 and 68. A second hydraulic fluid delivery line 80 delivers from the pump 73 to the hydraulic motor 61. Each of the hydraulic motors is connected to a return line 81 communicating with the reservoir 75. For each of the hydraulic fluid delivery lines 77 and 80, there is provided an air bleed valve 82 and a control relief valve 83. For each of the hydraulic motors there is provided a solenoid or manually operated directional control valve 84 which adapts the associated motor to be reversed when necessary to unclog the particular disk assembly section operated by that motor. Additional controls for each motor may comprise a pressure switch 85, a relief valve 87 and a flow control valve 88. Other control devices, such as sensors, electrical control switches, and the like, may be employed in the system, as well known.

In operation of the apparatus 12, refuse continuously delivered as by means of the conveyor 10 and including refuse in bags 11 is received on the first section of the screen bed 13 where loose material is sorted, glass and metal cans passing through this first section. An important feature at this point is to permit the glass to pass through this portion of the disk screen with a minimum of breakage, whereby to afford maximum salvage value for the glass. Courser or loose material, comprising mainly combustibles such as paper, travels on toward the discharge end of the separating bed 13 and filled bags 11 continue therewith to the bag breaker section of the bed where the rider disks 41 retard movement of the bags while the breaker disks 34a rip the bags open and propel the contents onward onto the downstream section of the separating bed. In order to maintain a reasonable spread level of the refuse material onto the downstream end portion of the bed 13, metering means comprising a metering bar 89 is disposed across the bed 13 at a desirable elevation above the disks 34 adjacently downstream from the breaker discs 34a. As the material passes the metering bar 89, the material is held and tumbled to help complete liberation of the spread refuse mass. In the final refuse separating section of the bed 13, the refuse is further sorted and glass and metal fractions will pass through the disk screen with minimum of damage. Refuse material discharged from the downstream end of the bed 13 will be predominately combustible material, such as paper and plastic, and such material is then further processed as explained in connection with FIG. 1.

It will be understood that variations and modifications may be effected without departing from the spirit and scope of the novel concepts of this invention.

I claim as my invention:

1. Raw refuse processing apparatus, comprising:
   a disk screen separating bed having a series of interdigitated rotatable disk assemblies comprising a series of screen disk assemblies and bag breaker disk assemblies, said bed adapted to receive raw refuse, including bagged refuse on said screen disk assemblies;
   said bed being operable to move said refuse including said bagged refuse in a downstream direction along said bed;
   and bag breaker means above and cooperating with said bag breaker disk assemblies as the refuse moves downstream on said bed for gripping the bags above by said bag breaker means and underneath by said bag breaker disk assemblies and thereby breaking the bags of said bagged refuse and thus liberating the bag contents onto said separating bed.

2. Apparatus according to claim 1, wherein said bag breaker means comprises sharp toothed rider disks, and said bag breaker disk assemblies comprise sharp tooth bag ripping disks.

3. Apparatus according to claim 2, including means for rotatably driving said bag breaker disk assemblies at greater rotary speed than said rider disks.

4. Apparatus according to claim 3, wherein said bag breaker means comprises a floating carriage carrying said rider disks.

5. Apparatus according to claim 4, wherein said floating carriage supports means for driving said breaker rider disks rotatably.

6. Apparatus according to claim 5, including means for modulating the operating position of said floating carriage.

7. Apparatus according to claim 1, wherein said bed is elongated in said downstream direction, means for delivering raw refuse including bags of refuse to said screen disk assemblies at an upstream location on said bed, a plurality of said screen disk assemblies at said upstream location providing a first phase treating section of said bed, a second phase treating section comprising a plurality of said bag breaker disk assemblies immediately downstream from said first phase treating section, and a third phase treating section downstream from said bag breaker disk assemblies and comprising a substantial plurality of said screen disk assemblies for completing separating of the refuse including refuse liberated from the bags.

8. Apparatus according to claim 7, wherein each of said sections of disk assemblies has a separate driving means, so that the disk assemblies of each section are adapted to be driven at differential speed relative to other sections.

9. Apparatus according to claim 7, wherein disks of the disk assemblies of said first and third sections have screening interface spacings substantially wider than the interface spacings of disks of said second section.

10. Apparatus according to claim 9, wherein said bag breaker means includes carriage means supporting a plurality of rider disk assemblies having interface spacings substantially matching the interface spacings of said bag breaker disk assemblies and located in spaced relation above said bag breaker disk assemblies less than the anticipated sizes of filled trash bags to be broken, said rider disks and said bag breaker disk assemblies having sharp pointed tooth projections for facilitating bag breaking, and said disks of said first and third sections having rounded projections.

11. A method of processing raw refuse, comprising:
    receiving raw refuse including bagged refuse at an upstream location on a disk screen separating bed comprising a series of interdigitated rotatable disk assemblies, said assemblies comprising screen disk assemblies and bag breaker disk assemblies;
    moving said refuse including said bagged refuse in a downsteam direction along said bed;
    and operating bag breaker means above and in cooperation with said bag breaker disk assemblies as the refuse moves along said bed, gripping the bagged refuse by and between said breaker means and said bag breaker disk assemblies and thereby breaking the bags of said bagged refuse and liberating the contents of the bags onto said separating bed.

12. A method according to claim 11, which comprises engaging the bags with delaying rider disks on said bag breaker means located opposite and acting in cooperation with said bag breaker disk assemblies.

13. A method according to claim 11, which comprises advancing the refuse containing bags toward said bag breaker disk assemblies, retarding advance of the bags along said bag breaker disk assemblies by operation of said bag breaker means, and subjecting the bags to ripping action of sharp toothed disks of said bag breaker disk assemblies.

14. A method according to claim 11, which comprises subjecting refuse, delivered to the separating bed, to three steps comprising separating glass containers and cans in a first step separation and advancing loose combustible material and trash bags to the second step wherein the trash bags are broken and contents liberated, and in the third step sorting glass containers and cans from the liberated material and advancing combustible material toward discharge from said bed.

15. A method according to claim 11, which comprises rotatably driving said bag breaker disk assemblies at a greater speed than retarding disk assemblies of the bag breaker means cooperating therewith and thereby facilitating breaking of the bags.

16. A method according to claim 11, which comprises rotatably driving said disk assemblies, rotatably driving rider disk assemblies of said bag breaker means which cooperates with said bag breaker disk assemblies, and effecting self-clearing reversal of any of said disk assemblies when necessary.

17. Raw refuse processing apparatus, comprising:
   a disk screen separating bed having a series of interdigitated rotatable disk assemblies comprising a series of screen disk assemblies and bag breaker disk assemblies, said bed adapted to receive raw refuse, including bagged refuse on said screen disk assemblies at one end of said bed;
   bag breaker means cooperating with said bag breaker disk assemblies for breaking the bags and liberating the bag contents onto said separating bed;
   said bed being elongated in a direction of refuse separating movement;
   means for delivering raw refuse including bags of refuse to an upstream end of said bed;
   a plurality of screen disk assemblies adjacent to said upstream end providing a first phase treating section of said bed;
   a second phase treating section comprising a plurality of said bag breaker disk assemblies immediately downstream from said first phase treating section;
   and a third phase treating section downstream from said second phase section and comprising a substantial plurality of screen disk assemblies for completing separating of the refuse including refuse liberated from the bags;
   disks of the disk assemblies of said first and third sections having screening interface spacings substantially wider than the interface spacings of disks of said second section;
   said bag breaker means including carriage means supporting a plurality of rider disk assemblies having interface spacings substantially matching the interface spacings of said bag breaker disk assemblies and located in spaced relation above said bag breaker disk assemblies less than the anticipated sizes of filled trash bags to be broken, said rider disks and said bag breaker disk assemblies having sharp pointed tooth projections for facilitating bag breaking, and said disks of said first and third sections having rounded projections.

* * * * *